United States Patent
Nichols et al.

(10) Patent No.: US 10,071,482 B2
(45) Date of Patent: Sep. 11, 2018

(54) ROBOTIC VEHICLE PAINTING INSTRUMENT INCLUDING A TERAHERTZ RADIATION DEVICE

(71) Applicant: FORD MOTOR COMPANY, Dearborn, MI (US)

(72) Inventors: Mark Edward Nichols, Saline, MI (US); Tony Misovski, Oxford, MI (US); Scott Adams, Milan, MI (US); Aaron Fiala, Newport, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/829,888

(22) Filed: Aug. 19, 2015

(65) Prior Publication Data

US 2017/0050208 A1    Feb. 23, 2017

(51) Int. Cl.
| | |
|---|---|
| *B05B 12/08* | (2006.01) |
| *B25J 9/16* | (2006.01) |
| *B05D 7/00* | (2006.01) |
| *B05B 13/04* | (2006.01) |

(52) U.S. Cl.
CPC .......... *B25J 9/1679* (2013.01); *B05B 12/084* (2013.01); *B05B 13/0452* (2013.01); *B05D 7/53* (2013.01); *B05D 7/57* (2013.01); *Y10S 901/43* (2013.01)

(58) Field of Classification Search
None
See application file for complete search history.

(56) References Cited

U.S. PATENT DOCUMENTS

| | | | |
|---|---|---|---|
| 5,240,745 A * | 8/1993 | Yamamoto | B05B 12/122 118/315 |
| 7,145,148 B2 | 12/2006 | Alfano et al. | |
| 7,214,940 B2 | 5/2007 | Cluff et al. | |
| 7,876,423 B1 | 1/2011 | Roth | |
| 8,050,531 B2 | 11/2011 | Rahman et al. | |
| 8,399,838 B2 | 3/2013 | Evans et al. | |
| 8,619,832 B2 | 12/2013 | Hu et al. | |
| 2002/0114883 A1* | 8/2002 | Mushett | B05D 5/063 427/163.4 |
| 2003/0089563 A1* | 5/2003 | Takakusagi | C09D 5/084 188/218 XL |
| 2005/0106328 A1* | 5/2005 | Moore | B05B 12/00 427/421.1 |

(Continued)

FOREIGN PATENT DOCUMENTS

EP           0943372 A2 *   9/1999    ........... B05B 7/1404

OTHER PUBLICATIONS

Machine Translation of EP 0943372 A2, Retrieved on Dec. 5, 2016.*

(Continued)

*Primary Examiner* — Francisco W Tschen
(74) *Attorney, Agent, or Firm* — Brooks Kushman P.C.

(57) ABSTRACT

A method comprising scanning a first painted surface of a first vehicle having two or more paint layers with a robotic terahertz radiation instrument to obtain a first painted surface thickness data and map for each of the two or more paint layers, comparing the first thickness map to a control map, and adjusting one or more paint application parameters based on a comparison of the first thickness map with the control map for painting a second surface of a second vehicle different than the first vehicle.

20 Claims, 6 Drawing Sheets

(56) References Cited

U.S. PATENT DOCUMENTS

| | | | |
|---|---|---|---|
| 2006/0011812 A1* | 1/2006 | Wolleschensky | G02B 21/002 250/208.1 |
| 2007/0114418 A1* | 5/2007 | Mueller | G01J 3/42 250/341.1 |
| 2007/0114419 A1 | 5/2007 | Bastiaans et al. | |
| 2007/0138392 A1* | 6/2007 | Cole | G01N 21/49 250/341.1 |
| 2007/0235658 A1* | 10/2007 | Zimdars | G01J 3/42 250/390.07 |
| 2009/0066344 A1* | 3/2009 | Bray | G01B 15/02 324/644 |
| 2010/0090112 A1* | 4/2010 | Kawada | G01N 21/3581 250/338.4 |
| 2010/0195090 A1* | 8/2010 | Ohtake | G01B 11/0625 356/51 |
| 2011/0028824 A1 | 2/2011 | Cole et al. | |
| 2012/0076923 A1* | 3/2012 | Bucher | G01B 11/0608 427/9 |
| 2012/0326041 A1* | 12/2012 | Kawada | G01N 21/3581 250/353 |
| 2013/0204577 A1 | 8/2013 | Savard et al. | |
| 2013/0309302 A1 | 11/2013 | Funke et al. | |

OTHER PUBLICATIONS

Chen et al., Automated Industrial Robot Planning for Spray Painting Process: A Review, 4th IEEE Conference on Automation Science and Engineering, 2008, 522-527 (Year: 2008).* http://www.photonics.com/Article.aspx?AID=56233, "THz Technique Determines Paint Thickness", Research & Technology, May 2014, 2 pages; date accessed: Dec. 30, 2014.

http://www.opticsinfobase.org/ao/abstract.cfm?uri=ao-44-32-6849, Yasui, Takeshi et al. "Terahertz paintmeter for noncontact monitoring of thickness and drying progress in paint film", Optics InfoBase: Applied Optics, 2 pages; dated accessed: Dec. 30, 2014.

"Online/Robotic Integrated Thickness and Color Measurement", Finishing Today, Jan. 2006, 3 pages.

* cited by examiner

ROBOTIC VEHICLE PAINTING INSTRUMENT INCLUDING A TERAHERTZ RADIATION DEVICE

TECHNICAL FIELD

The disclosure relates to a robotic vehicle painting instrument including a terahertz radiation device and methods for using terahertz radiation to measure thickness of individual paint layers applied to a vehicle body surface and adjusting the robotic vehicle painting instrument accordingly.

BACKGROUND

The application of paint to vehicle exterior is typically accomplished by robotic automation. In common application, paint applicators apply paint to moving vehicles as they progress through the paint booth. Using the robotic application, the paint layer thickness may vary from location to location on a vehicle and from vehicle to vehicle at the same location, although not as much as in non-automatic paint applications. Because various performance characteristics of the paint system depend on the paint thickness, proposals for measuring the thickness of each paint layer in a complete paint system have been developed. However, additional accuracy in control is desired.

SUMMARY

A method including a step of scanning a first painted surface of a first vehicle having two or more paint layers with a robotic terahertz radiation instrument to obtain a first painted surface thickness data and map for each of the two or more paint layers is disclosed. The method may include a step of comparing the first thickness map to a control map. The method may include a step of adjusting one or more paint application parameters based on a comparison of the first thickness map with the control map for painting a second surface of a second vehicle different than the first vehicle. The first and second surfaces may be on the same body part. The same body part may be a vehicle door or hood. The adjusting step may include adjusting a path of a robotic vehicle painting instrument. The scanning step may include directing the robotic terahertz radiation instrument at the first painted surface. The two or more paint layers may include at least three paint layers having different chemical composition from each other. The two or more paint layers may include at least three layers and the first painted surface may include interfaces between each pair of adjacent paint layers of the at least three paint layers. The scanning step may include recording reflections from each interface. The first thickness map may be generated based on a refractive index of the two or more paint layers and time delay of the reflections.

In another embodiment, a method including scanning a first painted surface of a first vehicle with a robotic terahertz radiation instrument to obtain a first painted surface mapping is disclosed. The method may include a step of determining a robotic vehicle painting instrument path for applying one or more layers of paint to a second surface of a second vehicle different than the first vehicle based on the first painted surface mapping. The robotic terahertz instrument may include an emitter head emitting continuous waves having amplitude oscillating at a terahertz frequency. The scanning step may include translating the emitter head. The scanning step may include emitting continuous waves having amplitude oscillating at a terahertz frequency from the emitter head. The scanning step may also include translating the emitter head above the first painted surface to generate one or more line scans as part of the first painted surface mapping. The scanning step may further include positioning the emitter head above the first painted surface using a laser rangefinder. The method may include a step of determining a tangent plane via one or more sensors for the first painted surface and the scanning step may include positioning the emitter head based on the tangent plane. The second surface may be an unpainted second surface. The first and second surfaces may be on the same body part. The same body part may be a vehicle door or hood.

In yet another embodiment, an apparatus comprising a robotic vehicle painting instrument and a terahertz radiation instrument connected to the robotic vehicle painting instrument is disclosed. The robotic vehicle painting instrument may be provided to receive first surface mapping of a first painted surface of a first vehicle from the terahertz radiation instrument and to determine a path of the robotic vehicle painting instrument for a second surface of a second vehicle different than the first vehicle based on the first surface mapping. The first and second surfaces may be on the same body part. The same body part may be a vehicle door or window flange.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

An automotive paint system includes a number of successively overlaid paint layers on top of a substrate. The various layers fulfill different functions such as provide corrosion resistance, smooth a previously applied coating, protect a previously applied coating from UV light, promote adhesion, provide color, provide gloss, etc. Therefore, the various layers typically include layers of varying thickness and chemical composition. The layers typically include a pretreatment layer including phosphates, followed by an electro coat, a primer, a base coat, and a clear coat. Together, the paint layers form a paint system.

The application of individual paint layers to a vehicle exterior and/or interior is typically accomplished by robotic automation. In the paint booth, paint applicators such as robots having high speed bells or fixed automation apply paint to moving vehicles as they progress through the paint booth. Robotic application provides for enhanced control of the paint layer thickness as opposed to non-automated paint applications, but even further control is desired. Several factors influence the uniformity of paint layer thickness and of the entire paint system applied to a vehicle body surface. These factors include, but are not limited to, non-optimized robot pathing, assembly line speed changes due to production increases/decreases, inherently imperfect control over fluid dosing rates, changes in air flow in the paint booths, or the like. Thus, the paint layer thickness varies from location to location on a vehicle and from vehicle to vehicle at the same location.

Many critical performance characteristics of the paint system are strong functions of the paint thickness. Non-limiting examples include long-term durability, stone chip resistance, color, appearance, and windshield bonding performance. The individual paint layer thickness information may be used to control paint application parameters and ensure high quality of the entire paint system. Because of the relationship between the paint layer thickness and the paint system performance, significant effort has been applied to measuring the thickness of each layer in the paint system. Yet, previously devised methods suffer from one or more drawbacks.

An exemplary method for paint layer thickness assessment is ultrasonic inspection such as PELT™ technology from JSR Ultrasonics. The PELT™ technology utilizes a gauge transmitting an ultrasonic signal through one or more paint layers by placement of an ultrasonic transducer on the sample to be measured. A liquid couplant such as water is used to facilitate the transmission of the signal into the paint layers. As the signal crosses an interface between two adjacent layers, an echo is generated. Layer thickness is determined from the time delay between successive layer boundary echoes and the speed of sound in the material. While this technology can be fitted into an automated cell and is reasonably rapid, other aspects of the ultrasonic inspection present shortcomings. For example, after the clear coat is applied to a vehicle surface, contact with the surface should be minimized; yet, the ultrasonic inspection requires contact with the paint layers. Additionally, in some applications, the use of a coupling fluid, which is required in the ultrasonic inspection, may be undesirable as the coupling fluid may interfere with dirt detection equipment. Furthermore, the ultrasonic inspection cannot provide measurements of certain critical vehicle body portions such as a windshield flange. An additional disadvantage of the ultrasonic scanning stems from the way the data is gathered. The gauge is applied to a vehicle painted surface at a number of spots which provides limited information about the paint system.

It is desirable to provide a method of measuring thickness of each individual paint layer on the vehicle body painted surface which would overcome one or more limitations of the previously devised measuring methods. It would be desirable to provide a measuring method which would be non-destructive and non-contacting so that the painted surface remains intact. It would be further desirable to develop a method capable of measuring paint layer thickness in small and hard-to-access areas such as the windshield flange. Additionally, it would be desirable to develop a measuring method which would be capable of providing line or area scan data. Additionally still, it is desirable to develop a method which would not require application of a couplant to the painted surface.

According to one or more embodiments, a method is provided which includes using terahertz radiation beam 10 to assess the thickness of individual paint layers 12 (shown in FIG. 2) within a paint system 14 on a vehicle surface 16. Terahertz radiation, also known as submillimeter radiation, or THz, consists of electromagnetic waves within the International Telecommunications Union-designated band of frequencies from about 0.3 to about 3 terahertz. Wavelength of radiation in the terahertz band ranges from about 1 mm to about 100 µm. Terahertz radiation represents a region between microwaves and infrared light waves in the electromagnetic spectrum also known as the terahertz gap. Terahertz radiation is non-ionizing, travels in a line of sight, and can penetrate a wide variety of materials. Terahertz radiation can thus be used for quality control of a variety of materials which are transparent to terahertz radiation, including vehicle body paint compositions.

Figure 2:
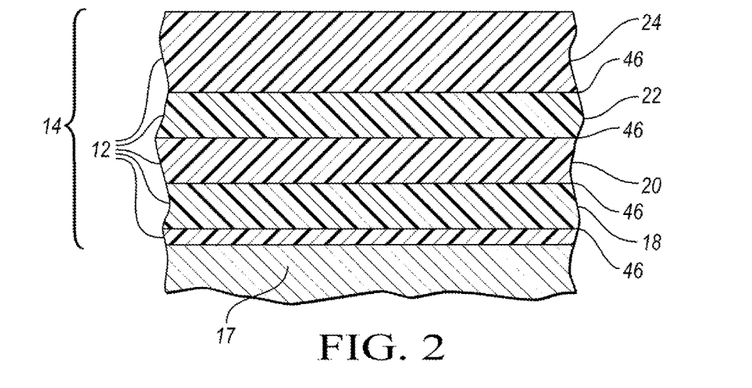
FIG. 2 depicts a schematic cross-sectional view of the paint layers in a section taken along the lines 2-2.

The paint system 14 includes paint layers 12 applied to a substrate 17. The composition of the substrate 17 may vary. The substrate 17 may be metal including steel, iron, aluminum, copper, titanium, platinum, rhodium, tin, lead, zinc the like, or they alloys. The substrate 17 may be formed from plastics, thermoplastics, rubbers, carbon fiber-reinforced polymers, fiberglass or other composite materials such as graphite-epoxy, glass, ceramic, and even wood or fabric. Any type of a substrate 17 is contemplated. The composition of the substrate 17 may depend on the type of a vehicle whose painted surface 16 is to be assessed. The method, as described below, may be used to assess a painted surface 16 of any type of vehicle. Non-limiting exemplary types of vehicles include land vehicles such automobiles, buses, vehicles for transportation of goods, motorcycles, off-road vehicles, tracked vehicles, trains, amphibious vehicles, aircrafts, space crafts, watercrafts, or the like.

The number of individual paint layers 12 on a vehicle body painted surface 16 may differ. While brand new vehicles may include about 3 to 6 layers, paint systems of renovated vehicles may include a dozen or more paint layers. A paint layer system 12 applied to a vehicle body painted surface 16 typically may include one or more of each pretreatment layer, an electro coat, a primer, a base coat, and a clear coat. The vehicle body painted surface 16 includes an interface between adjacent paint layers 12. The paint layers 12 may further include enamels, putties, under coats, pretreatment layers, and other layers. The term paint layer, as used herein, includes coatings such as passivation coating and other materials which are applied to a vehicle surface to improve properties such as appearance, adhesion, wettability, corrosion resistance, wear resistance, scratch resistance, chemical resistance, mechanical resistance, and weathering resistance.

The paint layers 12 differ from each other in terms of their chemical and physical composition. The paint layers 12 may contain paints and coatings of liquid, liquefiable, or mastic composition, which converts to a solid film after application to a substrate 17. The paints and coatings of the paint layers may be solvent-based such as oil-based or alkyd-based; water-based such as aqueous emulsion/latex paints or acrylic paints; high-solids paints with low volatile organic compound content; powder coatings; or radiation curable coatings. The paints and coatings may contain one or more of the following components: a binder, a diluent and/or solvent, pigments and/or fillers, and additives.

The binder is a film-forming component of the paint responsible for adequate adhesion of the coating to a substrate. The binder may include natural or synthetic resins such as alkyds, acrylics, melamine resins, epoxy, vinyl, vinyl-acrylics, styrene acrylic, vinyl acetate/ethylene, phenol/formaldehyde condensates, polyurethanes, polyesters, nitrocellulose, polyamide, or polymerizable oils.

The diluent or solvent serves as a medium in which the binder, pigments, and additives are dispersed and/or adjusts the viscosity of the paint. The diluent may be water, organic solvents such as aliphatic compounds, aromatic compounds, alcohols, ketones, mineral spirits, turpentine, and the like. Specific examples of a solvent may be petroleum distillate, esters, glycol esters, xylene, toluene, ethylbenzene, n-butyl acetate, n-butanol, isopropanol, 2-butoxyethanol, dimethylformamide, methyl ethyl ketone, naphthalene, the like or a combination thereof.

Pigments may be used to contribute color or opacity, protect the substrate from UV light, increase hardness, decrease ductility, and/or adjust gloss level. The pigments may be organic or inorganic. Examples of pigments may include calcium carbonate, mica, silicas, talcs, barium sulfate, titanium dioxide, aluminum silicates, the like, or a combination thereof.

Fillers may be used for reinforcing the binder, giving the paint texture, and/or increasing the paint volume. Additives may serve a variety of functions such as to modify surface tension, flow and leveling properties, appearance, gloss, texturing, increase wet edge and/or antifreeze properties, improve pigment stability, control foaming and/or skinning, modify rheology, modify mar resistance, act as catalysts, driers, thickeners, stabilizers, emulsifiers, texturizers, adhesion promoters, UV stabilizers, corrosion inhibitors, texturizers, de-glossing agents, biocides, fungicides, insecticides, algaecides, the like, or a combination thereof.

Because each paint layer 12 has a different chemical composition, each paint layer also has a different refractive index which provides for different refraction and reflection. The refractive index determines how much light is bent, or refracted, when entering a paint layer. The refractive index also determines the amount of light that is reflected when the radiation reaches an interface between two adjacent paint layers. The refractive index n is defined as the ratio of the speed of light in vacuum $c=2.99 \times 10^8$ m/s and the phase velocity v of light in the medium, $n=c/v$. The refractive index of one or more paint layers may be relatively low such as about 1.32 or as high as about 2. Typically, the refractive index may be between about 1.2 and about 1.5.

Each of the paint layers 12 may have a different thickness ranging from about 1 µm or less to about 200 µm or more. Typically, the thickness of one or more paint layers 12 may be from about 20 µm to about 50 µm. An exemplary non-limiting thickness of each paint layer 12, as depicted in FIG. 2, may be as follows: the electro coat 18 may be about 10 to about 25 µm thick, the primer 20 may be about 10 to about 25 µm thick, the base coat 22 may be about 5 to about 20 µm thick, and the clear coat 24 may be about 30 to about 55 µm thick. In one or more embodiments, the complete paint system 14 may include an electro coat 18 having a thickness of about 20 µm, a primer 20 having a thickness of about 20 µm, a base coat 22 having a thickness of about 15 µm, and a clear coat 24 having a thickness of about 45 µm.

Figure 1:
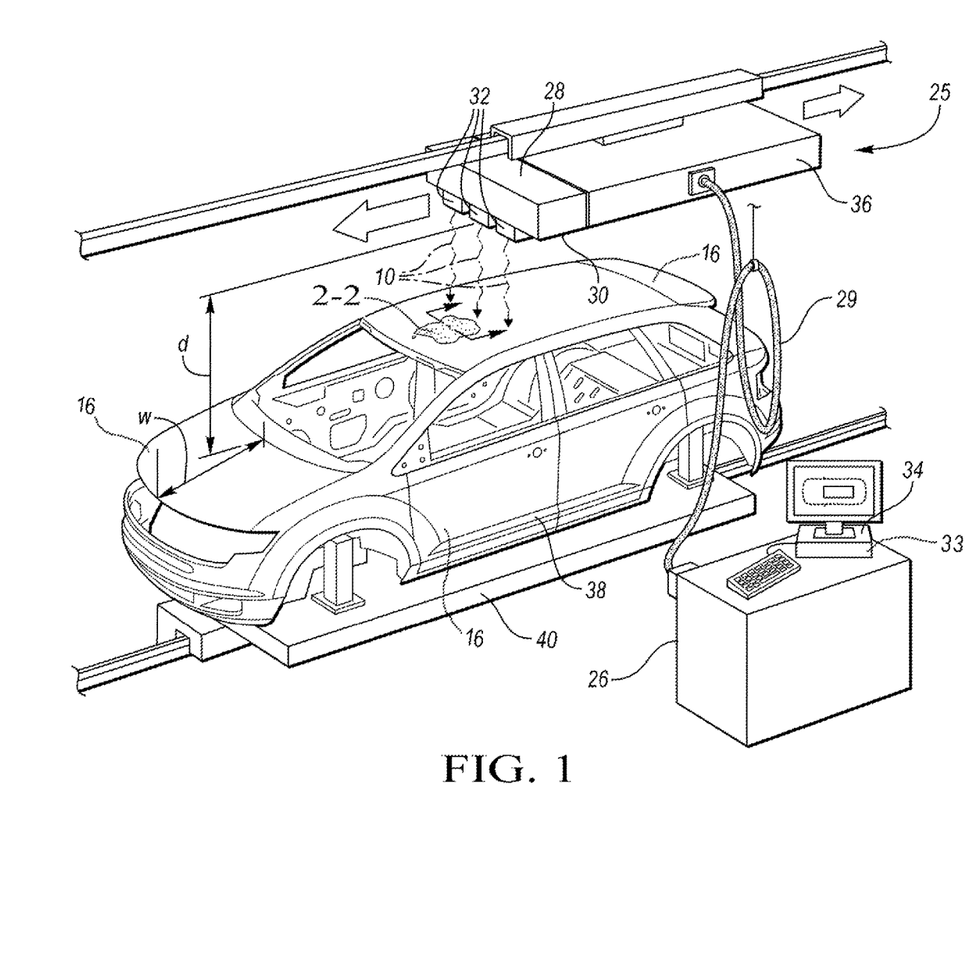
FIG. 1 depicts a perspective schematic view of a vehicle body painted surface and robotic terahertz radiation instrument capable of measuring thickness of individual paint layers of the vehicle body painted surface in accordance with one embodiment.

The method employs a robotic terahertz radiation instrument 25. The instrument may include one or more contact and/or non-contact probes. The instrument 25 includes a source of terahertz radiation having an emitter 26 capable of producing terahertz radiation. Any emitter 26 capable of producing terahertz radiation beam 10 may be used. The source of terahertz radiation may be an electronic or photonic source. The electronic source may include an electron-beam source such as a gyrotron, a free-electron laser, or backward-wave oscillators; a solid-state source such as Gunn devices; a frequency multiplier, or the like. The photonic source may include a laser-driven terahertz photoconductive antenna, terahertz quantum-cascade lasers, or the like. The emitter 26 may produce radiation pulses or emit terahertz radiation in a continuous wave. The emitter 26 may be coupled to an emitter head 28. Exemplary coupling may be provided via a fiber optic cable 29. The emitter head 28 may include a lens 30 for collecting the terahertz radiation. The emitter head 28 directs the terahertz radiation beam 10 at the vehicle painted surface 16. The instrument 25 may further include one or more sensors 32 capable of detecting radiation beam reflections, determining a tangent plane, the like, or fulfill a variety of different function. The one or more sensors 32 may be located on the emitter head 28. The instrument 25, one or more probes, the emitter 26, the emitter head 28, the one or more sensors 32, or a combination thereof may be connected to a micro processor units (MPU) 33, also known as a central processing unit capable of accepting digital data as input, processing the data according to instructions stored in its memory, and providing output. The MPU 33 may be located in a movable member 36, a computer unit 34, or the like. The MPU 33 may include mathematical modeling software which is capable of processing data received from the instrument 25, one or more probes, the emitter head 28, the one or more sensors 32, and/or additional sources of data.

Advantageously, the terahertz radiation beam 10 can be directed at a surface from a distance. This allows assessment of the paint layer 12 thickness without contacting the vehicle painted surface 16. Because there is no direct contact between a measuring device and the vehicle painted surface 16, addition of a liquid couplant is not required. The distance d between the emitter 26 and the vehicle painted surface 16 may be adjusted according to the needs of a specific application. The distance d may be about 2.5 cm or less to about 25 cm or more.

In one or more embodiments, the emitter head 28 may be portable. The emitter head 28 may be handheld and/or easily adjustable so that the terahertz radiation beam 10 can be directed at the vehicle painted surface 16 in a desirable angle and from a desirable distance. The emitter head 28 may be affixed to a member which is not movable. Alternatively, the emitter head 28 may be permanently or temporarily affixed to a movable member 36 capable of translating the emitter head 28 above the vehicle painted surface 16. The movable member 36 may be capable of adjusting the distance d. In at least one embodiment, the movable member 36 may be capable of moving up, down, left, right, forward, backward, towards the painted surface, away from the painted surface, in a plane, at an angle. The movable member 36 may move at different speeds according to the needs of a specific application. The movable member 36 may be capable of translating the emitter head 28 above an entire vehicle painted surface 16 or a portion of the vehicle painted surface 16. The movable member 36 may be capable of translating the emitter head 28 across a width w of a portion of a vehicle painted surface 16 so that a line scan is generated from the collected data. The movable member 36 may be capable of translating the emitter head 28 to collect data from a number of points across the vehicle painted surface 16. The movable member 36 may be also capable of translating the emitter head 28 across the painted surface 16 so that an area map can be created from the collected data. The movable member's 36 path may be preprogrammed, automated, adjusted by means of software. The movable member 36 may be a robot arm.

Alternatively or in addition to the emitter head 28 being translated above the vehicle painted surface 16, the vehicle 38 or a portion of the vehicle 38 may be located on a platform 40 or any other device capable of changing position and/or location of the vehicle 38 or a portion of the vehicle 38. In at least one embodiment, the emitter head 28 may thus be stationary and scan the painted surface 16 while the painted surface 16 is being moved beneath the emitter head 28.

The method includes a step of scanning a vehicle body painted surface 16 with a robotic terahertz radiation instrument 25 to obtain data about each individual paint layer 12 from which thickness of each individual paint layer 12 can be determined. The scanning step may include scanning of the entire vehicle body painted surface 16 or a portion of the painted surface 16. The portion may be any part of the vehicle body. Non-limiting exemplary portions may include a vehicle door, hood, trunk, panel, bumper, fender, tailgate, side member, reinforcement member, pillar, flange such as a windshield flange, or the like. The scanning step may include emitting terahertz radiation from the instrument 35. The scanning step may include emitting terahertz radiation pulses or continuous waves having amplitude oscillating at a terahertz frequency. The scanning step may include directing the terahertz radiation beam 10 from the emitter head 28 at the painted surface 16 to be assessed.

The scanning step may include positioning of the emitter head 28 above the vehicle body painted surface 16 and/or positioning of the vehicle body painted surface 16 beneath the emitter head 28. The positioning may be performed using a laser rangefinder, ultrasonics, machine vision, an absolute position of the robot relative to the surface normal, the like, or a combination thereof. The positioning may include determining a tangent plane via one or more sensors 32 for the vehicle body painted surface 16 and positioning the emitter head 28 based on the tangent plane. The scanning step may include positioning the emitter head 28 according to a vector that is perpendicular to the tangent plane and/or according to a distance of the emitter head 28 from the tangent plane.

In one or more embodiments, the scanning step may further include translating the emitter head 28 above the vehicle body painted surface 16. Alternatively, the scanning step may include scanning with a stationary emitter 26 and translating the painted surface of the vehicle 38 or a portion of the vehicle 38 beneath the instrument 25. The method may include a step of programming the MPU 33 to generate instrument's 25 scanning path to enhance the speed at which the emitter head 28 moves over the painted surface 16.

Figure 3:
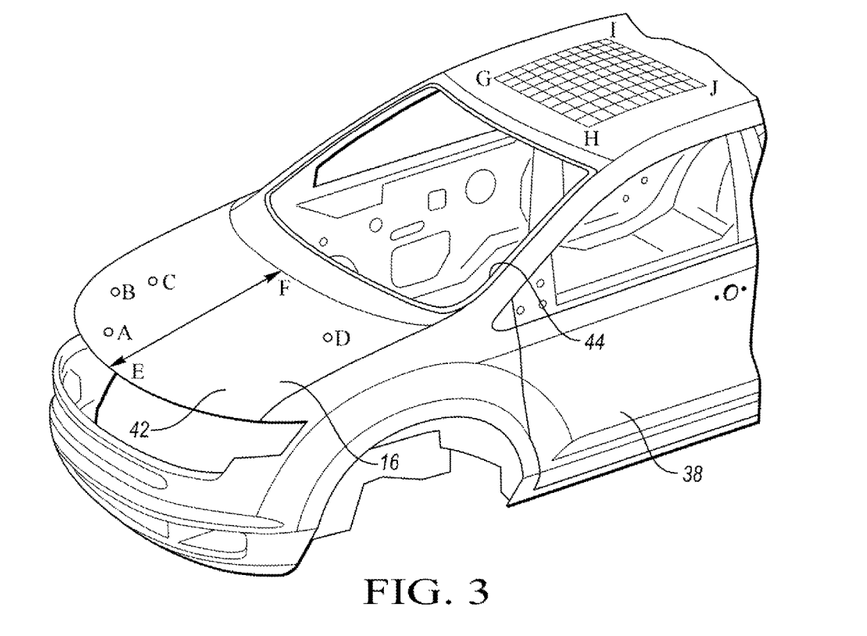
FIG. 3 shows a schematic perspective view of a portion of a vehicle body painted surface depicted in FIG. 1.
Figure 4:
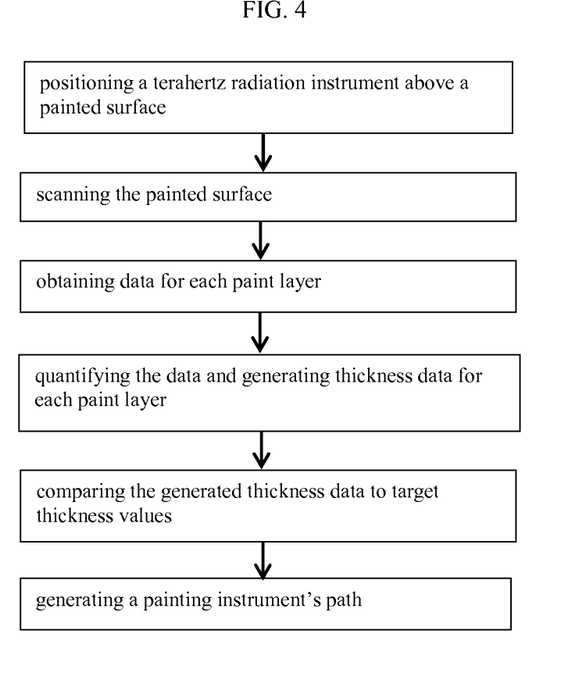
FIGS. 4-7 represent flow charts showing a set of method steps according to one or more embodiments.
Figure 5:
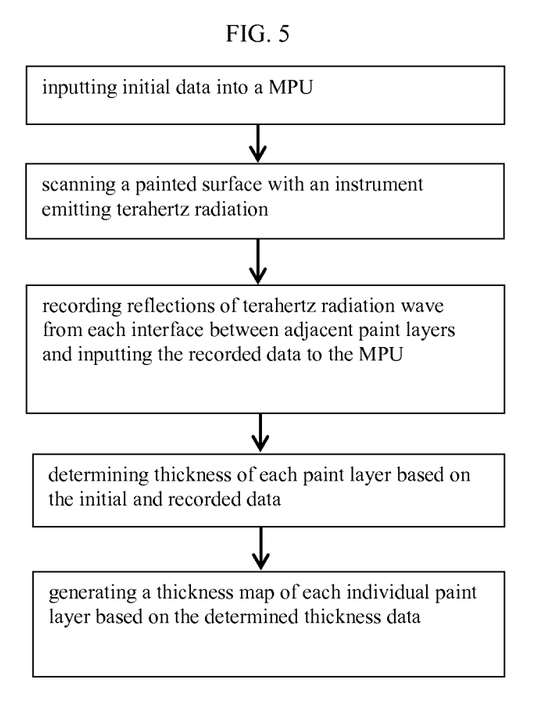
Figure 6:
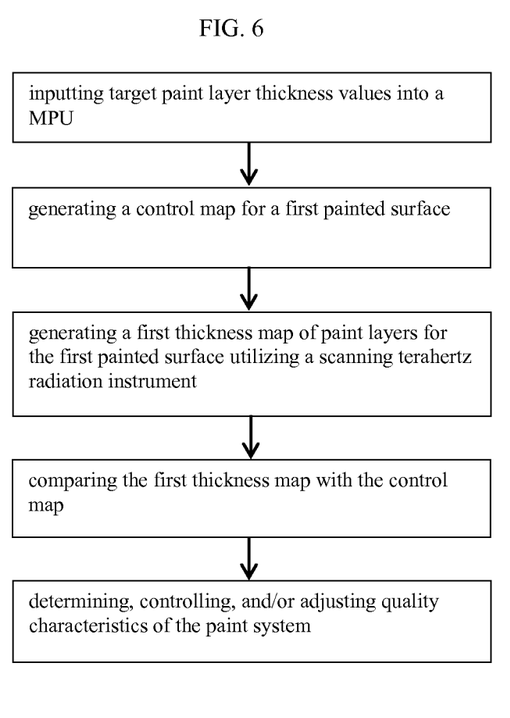
Figure 7:
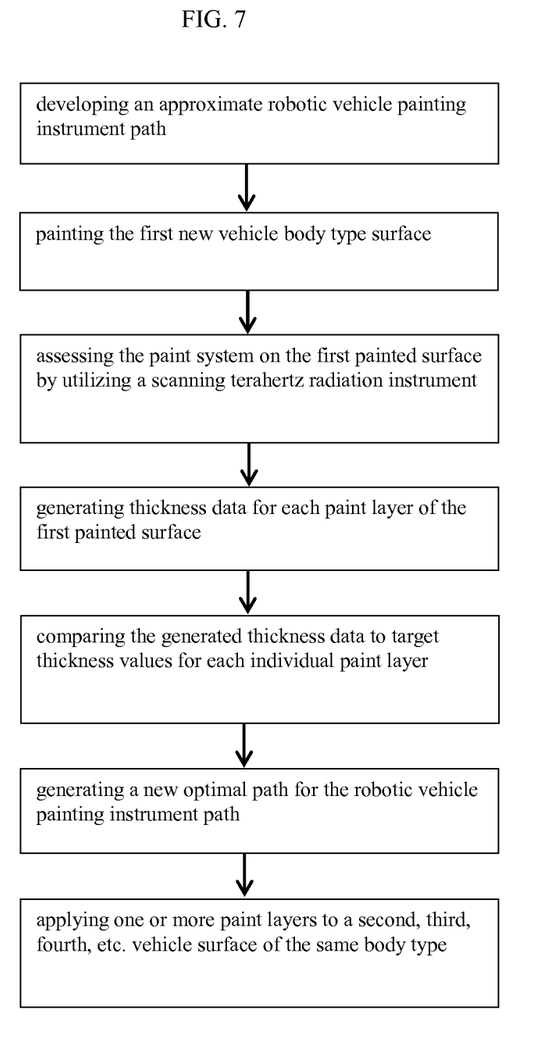

In at least one embodiment, the scanning step may include scanning a series of preselected points on the vehicle painted surface 16. As FIG. 3 illustrates, the scanned points A-D may be located in different portions of the painted surface 16. The series of points may be chosen in a random fashion, according to an algorithm, or chosen for specific reasons such as frequent need to make adjustments due to paint system insufficiencies or criticality of performance characteristics of the paint system 14 in a specific area of the painted surface 16. Thus, a high density of points can be scanned and their position may be well known.

Dimensions of the area to be scanned may differ. The method may include a step of adjusting a spot size of the terahertz radiation beam 10 according to the dimensions of the scanned area. A scanned area may be relatively large. Alternatively, a scanned area may be relatively small and hard to access by other thickness measurement techniques such as ultrasonic inspection. An exemplary hard-to-access area is a windshield flange 44. The thickness of the paint on the windshield flange 44 is a critical performance characteristic as the thickness is directly related to windshield bonding strength. The scanned area on the windshield flange 44z, or elsewhere on the painted surface 16, may be as small as less than about 1 cm$^2$, about 1 cm$^2$, or more than about 1 cm$^2$. The diameter of the scanned area may be less than about 500 µm, 250 µm, 100 µm, or 50 µm. The diameter of the scanned area may be about 25 µm or less to about 2 cm or more. Accordingly, the spot size of the terahertz radiation beam 10 may be adjusted from about 1 cm to about 0.5 µm or from about 10 cm to about 500 µm.

Alternatively, the scanning step may include scanning a series of points in a linear fashion across a portion of a painted surface 16 to produce a line scan. FIG. 3 illustrates such a line scan between points E and F across the width w of the hood 42. Alternatively still, the scanning step may include performing a raster scan. The raster scan refers to a scan pattern in which a painted surface 16 area is scanned from side to side in lines from top to bottom. This scan pattern generates a pattern of closely spaced rows of dots that form a map of the scanned area. This scan pattern is illustrated in FIG. 3 between points G, H, I, and J.

The instrument 25 may be programmed to collect data periodically. A time period between collection of data from two different points on the painted surface 16 defines a scanning interval. The scanning interval may be adjusted according to the needs of a specific application. In one or more embodiments, the scanning interval may be about a hundredth of a second, a tenth of a second, a second, 10 seconds, 100 seconds, or longer. The data may be collected continuously.

The method may include one or more steps. The steps may be performed in any order and may be repeated as needed. The method may include collecting initial data and inputting the initial data into the MPU 33 located in the movable member 36, the computer unit 34, or elsewhere. The initial data may include number of parameters such as number of paint layers 12 within the paint system 14 to be assessed, composition of each paint layer 12, refractive index of each paint layer 12, position of the preselected points, line scans, or raster to be measured, type of a substrate the paint system 14 is applied to, calibration curves, etc.

The method may include a step of collecting data for each paint layer 12 within the paint system 14. The method may include a step of acquiring data of each paint layer 12 as a function of the emitter head's 28 position. The method may further include recording reflections of the terahertz radiation wave from each interface 46 by one or more sensors 32. The method may include inputting the collected data to the MPU 33 and determining thickness of each paint layer 12 utilizing the MPU. The method may include a step of determining thickness of each paint layer 12 based on a refractive index of the one or more paint layers 12 and/or time delay of the reflections from each interface 46. The method may include a step of determining thickness of each paint layer 12 based on refraction of the terahertz radiation beam 10 from each interface 46. The method may employ different parameters detectable by the sensors 32 to determine thickness of each paint layer 12.

The method may utilize mathematical modeling to process the collected data and/or to generate a thickness graph, map, chart, table, the like, or a combination thereof of each individual paint layer 12 and/or of the paint system 14. The method may include quantifying the thickness data using software. The method may include displaying the thickness data for analysis in the form of one or more graphs, maps, tables, charts, images, plots or any other form conveying information about each paint layer 12 thickness.

The method may include comparing the generated thickness data to the target thickness values for each individual paint layer 12 by the MPU 33. The method may include inputting target individual paint layer thickness values of the paint system 14 on a vehicle surface into a MPU. The method may include a step of generating a control map for a first painted surface based on the input target values data. The method may include a step of generating the control map by other means. The method may include a step of generating a first thickness map of paint layers 12 for the first painted surface based on data collected while utilizing the scanning terahertz radiation instrument 25. The method may include a step of comparing the first thickness map with the control map. The method may include a step of determining which paint layers 12 are excessively thick or thin.

In one or more embodiments, the method may include a step of determining, controlling, and/or adjusting quality characteristics of the paint system 14 based on the comparison of the generated thickness data and the target thickness data. The method may include at least one adjusting step. The adjusting step may include adjusting one or more paint application parameters for the first painted surface 16 based on the comparison of the first thickness map with the control map. Exemplary paint application parameters may include painting distance, paint mass flow, rotational velocity of a paint bell, strength of the electrical field, mass flow rate of the guiding air, or the like. The adjusting step may further include adjusting a robotic vehicle painting instrument path. The method may include adjusting a robotic vehicle painting instrument path based on the comparison of the first thickness map with the control map.

The adjusting step may further include adjusting one or more paint application parameters for a second painted surface 16 based on the comparison of the first thickness map with the control map to ensure than the paint system 14 to be applied to the surface of the vehicle bodies to be painted in the paint booth will comply with the target values. The first and second painted surfaces may be on the same body portion such as a vehicle door, hood, trunk, windshield flange, or another body portion named above. The second painted surface may be on the same or a different vehicle than the first painted surface.

The method may further include a step of mapping a new vehicle body type in the paint booth to program optimal robotic vehicle painting instrument paths. When a new vehicle body type is introduced to the paint booth, robot paths are developed to efficiently and uniformly apply each layer of paint 12 to the vehicle body surface 16 to be painted. The method may include developing approximate robotic vehicle painting instrument paths before the first vehicle is painted. The method may further include utilizing an interactive process to tune and optimize the path and programming an initial path for the painting instrument. The method may include painting the first vehicle surface 16 and assessing the paint system 14 on the first vehicle surface 16 by the method utilizing terahertz radiation as described above. The method may include identifying insufficiencies such as excessively thin or thick paint layer or layers 12 in the paint system 14.

Based on the first vehicle body painted surface mapping, a robotic vehicle painting instrument path for applying one or more layers of paint to a painted or unpainted second vehicle body surface may be determined. The method may include adjusting one or more paint application parameters of the painting instruments based on insufficiencies in the paint system 14 disclosed during the terahertz radiation mapping of the first vehicle. The method may include adjusting the initial path to correct deficiencies in the paint system 14. The method may include a step of generating a new path for the robotic vehicle painting instruments for applying one or more layers of paint 12 to a second, third, fourth, etc. vehicle body surface of the same body type as the new vehicle body type.

The method may include assessing the painted surface 16 during various stages of paint application to the substrate 17. For example, the thickness of each paint layer 12 may be assessed after only a portion of paint layers 12 has been applied to the surface 16 or after the entire paint system 14 has been applied to the substrate 17. The assessment may be performed while the painted surface 16 is wet, dry, cold, warm, or hot.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method comprising:
    while emitting terahertz radiation, moving a robotic terahertz radiation instrument across a first painted surface of a first vehicle having multiple paint layers and adjusting a terahertz radiation beam spot size to about 0.5-µm responsive to a scanned area being a windshield flange to obtain a first painted surface thickness map at the windshield flange;
    comparing the thickness map to a control map; and
    adjusting a paint spray distance based on the comparison of the thickness and control maps for painting a surface of a subsequent second vehicle.

2. The method of claim 1, wherein the first painted surface of the first vehicle and the surface of the second vehicle are on the same type of a body part.

3. The method of claim 2, wherein the same type of the body part is a vehicle door or hood.

4. The method of claim 1, wherein the adjusting step includes adjusting a path of a robotic vehicle painting instrument.

5. The method of claim 1, wherein the scanning step includes directing the robotic terahertz radiation instrument at the first painted surface.

6. The method of claim 1, wherein the multiple paint layers include at least three paint layers having different chemical composition from each other.

7. The method of claim 1, wherein the multiple paint layers include at least three layers and the first painted surface includes interfaces between each pair of adjacent paint layers of the at least three paint layers.

8. The method of claim 7, wherein the scanning step includes recording reflections from each interface.

9. The method of claim 8, wherein the thickness map is generated based on a refractive index of the multiple paint layers and time delay of the reflections.

10. The method of claim 1, wherein the multiple paint layers comprise horizontally stratified layers.

11. The method of claim 1, wherein the scanning comprises raster scanning.

12. A method comprising:
scanning a first painted surface of a first vehicle having two or more paint layers and adjusting a robotic terahertz radiation spot size to about 0.5-μm while scanning a windshield flange to obtain thickness data;
comparing the thickness data to control data; and
adjusting a path of a robotic vehicle painting instrument based on the comparison of the thickness data and control data for painting a corresponding surface of a second vehicle.

13. The method of claim 12, wherein the thickness data is collected continuously.

14. The method of claim 13, wherein a time period between collection of data from two different points of the first painted surface is a hundredth of a second.

15. The method of claim 12, further comprising adjusting a rotational velocity of a paint bell based on a comparison of the thickness data and control data.

16. The method of claim 12, wherein the thickness data is determined while the first painted surface is wet.

17. A method comprising:
while emitting terahertz radiation, moving a robotic terahertz radiation instrument to continuously scan a first painted surface area of a first vehicle having two or more horizontally stratified paint layers, and adjusting a terahertz radiation beam spot size as a function of a size of a scanned area of the first painted surface area, the scanned area corresponding to a windshield flange, to obtain a first painted surface area thickness data and map for each paint layer;
comparing the thickness map to a control map; and
adjusting a path of a robotic vehicle painting instrument based on the comparison of the thickness and control maps for painting a surface area of a second vehicle different than the first vehicle.

18. The method of claim 17, wherein a scanning interval is a hundredth of a second.

19. The method of claim 17, wherein the continuous scanning includes performing a raster scan in a pattern in which the first painted surface area is scanned from side to side in lines from top to bottom.

20. The method of claim 17, wherein the thickness map is generated based on a refractive index of the two or more horizontally stratified paint layers and time delay of the reflections from each interface.

\* \* \* \* \*